US012683324B2

(12) United States Patent
Assow et al.

(10) Patent No.: US 12,683,324 B2
(45) Date of Patent: Jul. 14, 2026

(54) CONNECTOR SYSTEM AND SAFETY SLEEVE FOR SUCH A SYSTEM

(71) Applicant: MICROPOWER GROUP AB, Växjö (SE)

(72) Inventors: Johan Assow, Saltsjö-Boo (SE); Johan Svedendahl, Vällingby (SE); Göran Johansson, Järfälla (SE)

(73) Assignee: MICROPOWER GROUP AB, Växjö (SE)

( * ) Notice: Subject to any disclaimer, the term of this patent is extended or adjusted under 35 U.S.C. 154(b) by 373 days.

(21) Appl. No.: 18/563,621

(22) PCT Filed: May 17, 2022

(86) PCT No.: PCT/EP2022/063339

§ 371 (c)(1),
(2) Date: Nov. 22, 2023

(87) PCT Pub. No.: WO2022/248290

PCT Pub. Date: Dec. 1, 2022

(65) Prior Publication Data

US 2024/0222902 A1 Jul. 4, 2024

(30) Foreign Application Priority Data

May 25, 2021 (SE) .................................... 2150662-1

(51) Int. Cl.
*H01R 13/52* (2006.01)
*H01R 13/627* (2006.01)
*H01R 13/639* (2006.01)

(52) U.S. Cl.
CPC ....... *H01R 13/5219* (2013.01); *H01R 13/627* (2013.01); *H01R 13/639* (2013.01)

(58) Field of Classification Search
None
See application file for complete search history.

(56) References Cited

U.S. PATENT DOCUMENTS 3,986,765 A 10/1976 Shaffer et al.
5,507,664 A 4/1996 Carmo
(Continued)

FOREIGN PATENT DOCUMENTS

AT 503088 A1 7/2007
CH 695523 A5 6/2006
(Continued)

OTHER PUBLICATIONS

Swedish Search Report for Application No. 2150062-1, dated Jan. 13, 2022, 6 pages.
(Continued)

*Primary Examiner* — Ross N Gushi
(74) *Attorney, Agent, or Firm* — Alston & Bird LLP

(57) ABSTRACT

Connector system (1) comprising a first connector (2), a second connector (3) and a safely sleeve (4), where the safety sleeve (4) locks the first connector (2) to the second connector (3), where the connectors (2, 3) comprise protruding catches (109, 110, 201, 202) and the safety sleeve (4) comprises openings (306, 308, 310, 312) arranged on resilient tabs (307, 309, 311, 313), such that the resilient tabs (307, 309, 311, 313) can lock to the protruding catches, (109, 110, 201, 202) and where the connector system (1) comprises a seal (111). The advantage of the invention is that a reliable and waterproof connection is provided.

15 Claims, 4 Drawing Sheets

(56) References Cited

U.S. PATENT DOCUMENTS

| | | | | |
|---|---|---|---|---|
| 6,276,952 | B1 | 8/2001 | Ferranti et al. | |
| 9,153,905 | B2 * | 10/2015 | Colson | H01R 13/6392 |
| 2005/0233639 | A1 | 10/2005 | Blosch et al. | |
| 2007/0141886 | A1 | 6/2007 | Hammer et al. | |
| 2010/0285681 | A1 | 11/2010 | Saruwatari | |
| 2014/0235084 | A1 | 8/2014 | Colson et al. | |
| 2017/0133789 | A1 | 5/2017 | Haegele et al. | |
| 2018/0241151 | A1 | 8/2018 | Lane et al. | |
| 2019/0245305 | A1 | 8/2019 | Bowen et al. | |

FOREIGN PATENT DOCUMENTS

| | | | |
|---|---|---|---|
| CN | 201122728 | | 9/2008 |
| DE | P4237895 | A1 | 5/1993 |
| EP | 2495825 | A1 | 9/2012 |
| GB | 2 257 572 | A | 1/1993 |
| WO | 98/21516 | A1 | 5/1998 |
| WO | WO 2015/114138 | A1 | 8/2015 |

OTHER PUBLICATIONS

International Search Report and Written Opinion for Patent Cooperation Treaty Application No. PCT/EP2022/063339 dated Sep. 19, 2022, 10 pages.

European Office Action for Application No. 22730677.6, dated Jan. 2, 2026, 8 pages.

* cited by examiner

CONNECTOR SYSTEM AND SAFETY SLEEVE FOR SUCH A SYSTEM

CROSS REFERENCE TO RELATED APPLICATIONS

This application is a National Stage Application, filed under 35 U.S.C. § 371, of International Application No. PCT/EP2022/063339, filed May 17, 2022, which international application claims priority to and the benefit of Swedish Application No. 2150662-1, filed May 25, 2021; the contents of both of which as are hereby incorporated by reference in their entireties.

BACKGROUND

Technical Field

The present invention relates to a safety sleeve to be used in a connector system, where the safety sleeve attaches two connectors to each other in a secure way. The invention further relates to a connector system comprising such a safety sleeve.

Background Art

Connectors are used to connect e.g. a power source to an apparatus. One advantage of a connector is that it allows for an easy and quick connection and disconnection of e.g. a power cord to a fixed power inlet. Another advantage of using a connector as a power inlet is that the apparatus can be provided with a standardized power inlet, and a dedicated power cord having a country specific connector can be used for each specific market in which the apparatus is to be used. This simplifies the design and the certifications for the apparatus. One common standard for these types of connectors and inlets follow the IEC standard C13/C14 and C15/C16.

These connector types have several advantages, but also some disadvantages. They are very common and robust, a plug is easily connected to an inlet and the plugs are available in different configurations, both straight and angled. The inlets are also available in different configurations, comprising e.g. fuses, switches and filters. One disadvantage is however that there is no locking function that will secure the plug to the inlet. A plug can thus easily be disconnected from an inlet, even when the apparatus is under load. A further disadvantage is that regular connectors are not provided with a higher IP rating, e.g. of IP 54, IP 65 or higher.

Several locking functions has been proposed, and some are available on the market. In some solutions, a hoop or a shackle e.g. made from a steel wire, is used to hold the plug to the inlet. In some solutions, the plug and/or the inlet is provided with an internal spring-loaded catch that locks the plug to the inlet. US 2010285681, U.S. Pat. No. 5,507,664, US 2007141886, CN 201122728, U.S. Pat. No. 6,276,952 and US 2019245305 show different solutions to lock a plug to an inlet. US2014235084 shows an example where two connectors are attached to each other, where the front edges of the connectors are pressed against each other.

These solutions will secure a plug to an inlet, but they will not provide a higher IP rating, such as dust protection or water protection. A connector provided with internal catches is e.g. not completely waterproof.

There is thus room for an improved connector system and a safety sleeve to be used in such a connector system.

BRIEF SUMMARY

An object of the invention is therefore to provide a safety sleeve to be used to connect a first connector to a second connector. Another object of the invention is to provide an improved connector system comprising a first connector, a second connector and a safety sleeve.

The solution to the problem according to the invention is described in the characterizing part of claim 1 regarding the safety sleeve and in claim 9 regarding the connector system. The other claims contain advantageous embodiments and further developments of the safety sleeve and the connector system.

In a safety sleeve for a connector system comprising a first connector and a second connector, where the safety sleeve is adapted to lock the first connector to the second connector, where the safety sleeve comprises a circumferential body having a first rim arranged in a first plane and a second rim arranged in a second plane, the object of the invention is achieved in that the safety sleeve comprises a first opening arranged on a first resilient tab, a second opening arranged on a second resilient tab, a third opening arranged on a third resilient tab and a fourth opening arranged on a fourth resilient tab, where the first opening is adapted to cooperate with a first protruding catch of the second connector and the second opening is adapted to cooperate with a second protruding catch of the second connector, and where the third opening is adapted to cooperate with a first protruding catch of the first connector and the fourth opening is adapted to cooperate with a second protruding catch of the first connector, where the first opening and the second opening are arranged at the first rim and the third opening and the fourth opening are arranged at the second rim, and that the resilient tabs are positioned between the first rim and the second rim.

By this first embodiment of the safety sleeve according to the invention, a safety sleeve that will secure a first connector to a second connector is provided. With the use of a seal between the first connector and the second connector, a waterproof connection is obtained, having an IP code of at least IP 54, and preferably IP 65. In one example, the safety sleeve is fixedly attached to the second connector. The first connector is securely attached to the safety sleeve, but may be disconnected if required.

The inventive connector system comprises a first connector, a second connector and a safety sleeve, where the first connector and the second connector are provided with protruding catches. The catches will cooperate with openings of the safety sleeve, thereby locking the first connector to the second connector. The connector system further comprises a seal such that a waterproof connection is obtained.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims.

Figure 1:
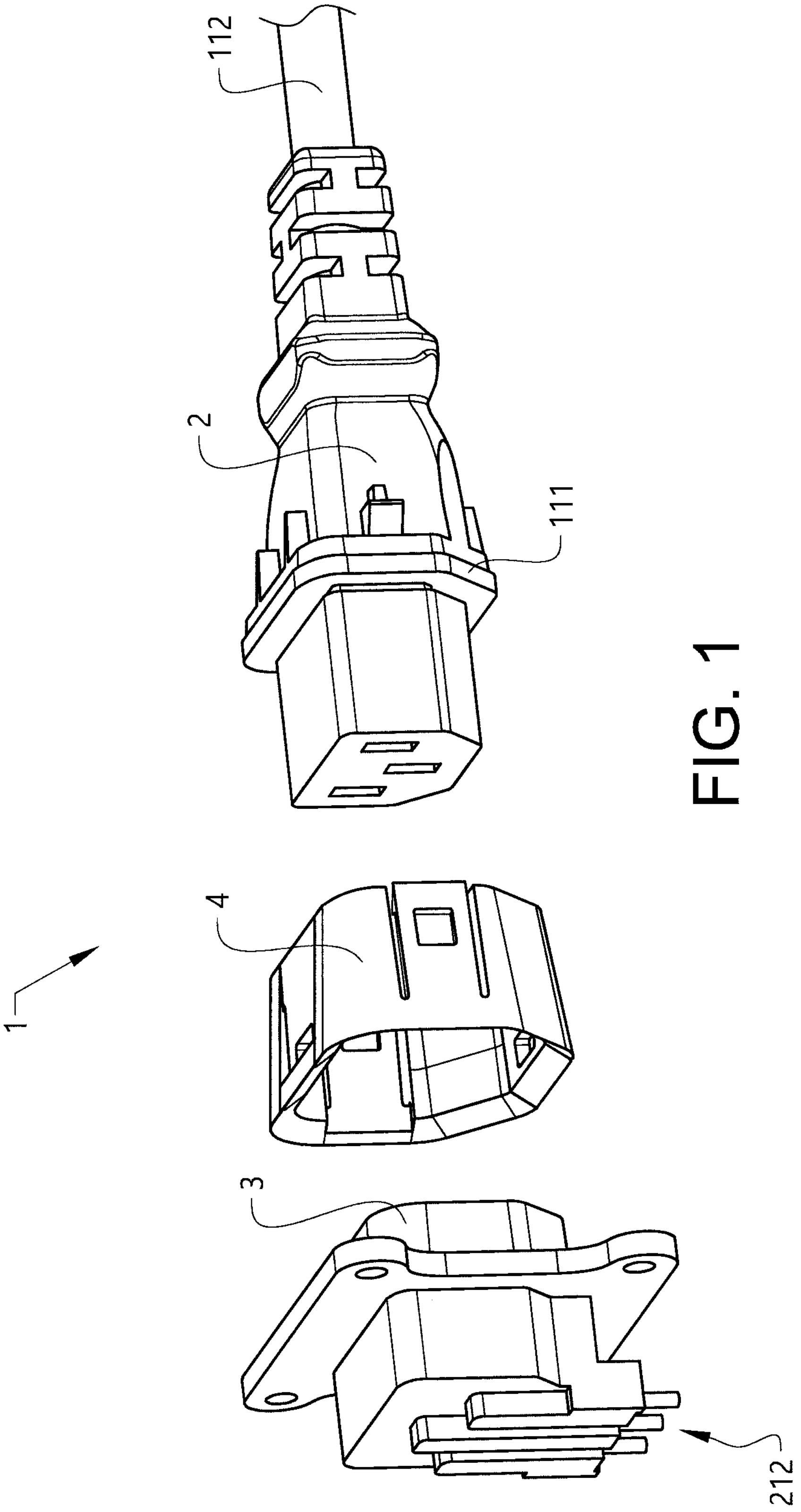
FIG. 1 shows an example of a connector system according to the invention.
Figure 2:
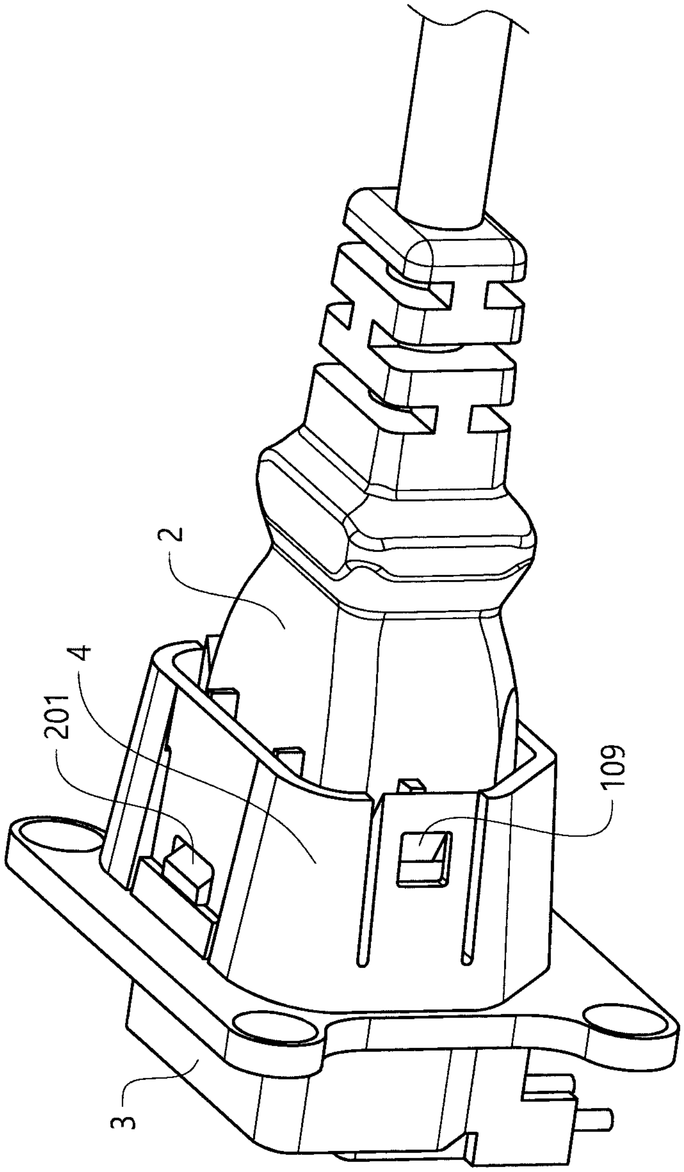
FIG. 2 shows an example of an assembled connector system according to the invention.
Figure 3:
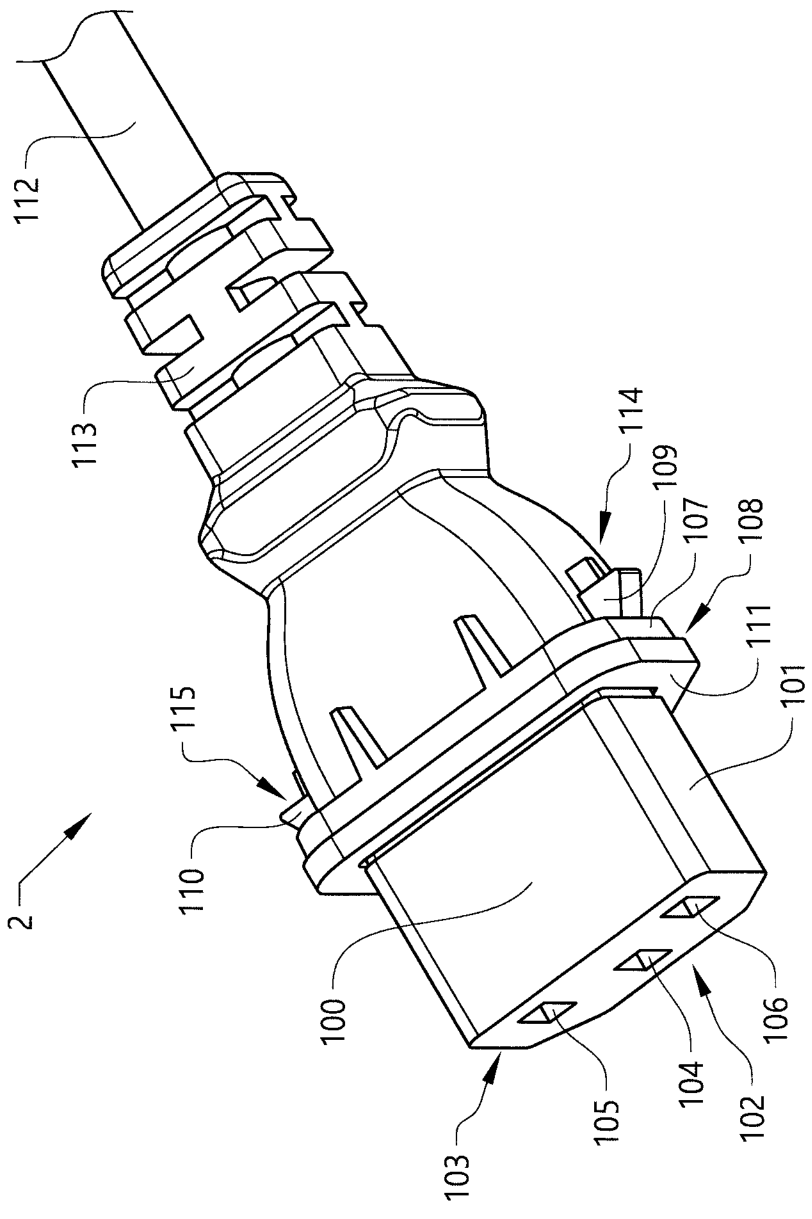
FIG. 3 shows an example of a first connector according to the invention.
Figure 4:
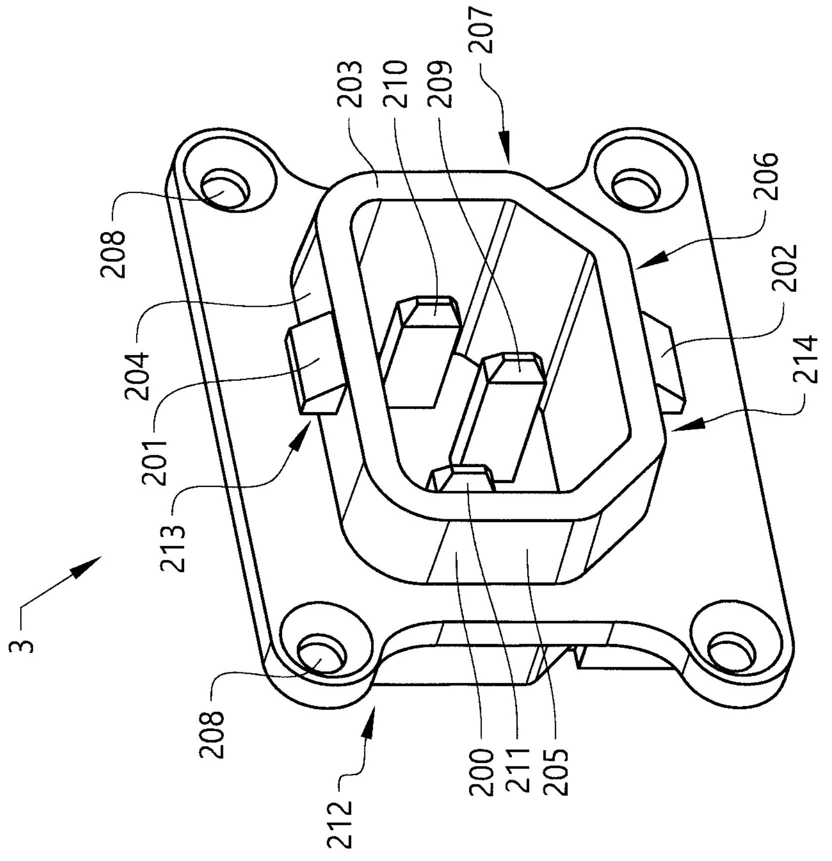
FIG. 4 shows an example of a second connector according to the invention.
Figure 5:
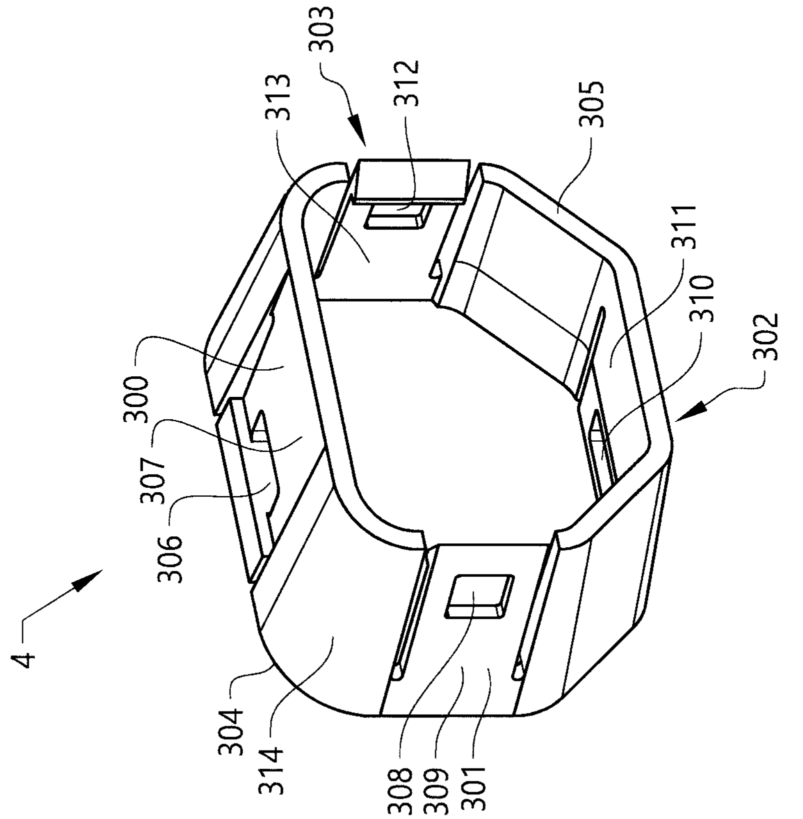
FIG. 5 shows an example of a safety sleeve according to the invention.

FIGS. 1 and 2 show an example of a connector system 1 according to the invention, and FIGS. 3 to 5 show components of the connector system. The connector system is primarily intended to be used to provide an electric appliance with the proper connector for a specific country or market, where the appliance requires an IP code of at least IP 54, and preferably at least IP 65. A first connector 2 is mounted on a cable that is provided with the desired connector at the other end. The first connector is moulded to the cable such that a waterproof connection of the first connector to the cable is obtained. The first connector is provided with a sealing 111 that will provide a waterproof seal when attached to the second connector 3. In the shown example, the first connector is a three terminal IEC C13 or C15 connector, but other connectors could also be used in an inventive connector system.

The second connector 3 is in one example adapted to be fixedly mounted in the housing of the appliance. The appliance may be e.g. a battery charger, a water pump or another equipment that requires a higher IP classification. The second connector is in the shown example an inlet that is adapted to be mounted to the housing with screws and a sealing that will seal the inlet to the housing. The connector terminals are moulded into the inlet, and the inlet is preferably closed such that the inlet is waterproof. In the shown example, the second connector is a three terminal IEC C14 or C16 inlet, but other inlet types could also be used in an inventive connector system. The second connector could also be e.g. a type E plug connector mounted on a cable, providing a waterproof extension cable.

The connector system 1 further comprises a safety sleeve 4 that will secure the first connector to the second connector. The safety sleeve is provided with openings arranged on resilient tabs that will cooperate with protruding catches of the first connector and the second connector, such that the first connector is securely attached to the second connector. The seal will ensure that the connection is waterproof according to at least IPX4. A protection according to IP54 or more preferably IP65 is of advantage. Other standards with similar purpose is preferably also met.

FIG. 3 shows an example of the first connector 2. In the shown example, a C13 plug connector is used as an example of a first connector, but other types would also be possible to use. The first connector 2 is provided with a first side 100, a second side 101, a third side 102 and a fourth side 103. The connector is rectangular, with the first and the third sides being the long sides and the second and fourth sides being the short sides. The edges between the third side and the second side respectively the fourth side are chamfered. The connector is provided with a first connection bay 104, a second connection bay 105 and a third connection bay 106 provided with connection terminals for the electrical connection. The connector is mounted to a cable 112 with a stress relief 113. The connector is moulded to the cable such that a waterproof connector is obtained. The connector is provided with an outwardly extending flange 107 that runs around the connector and provides a front surface 108 facing to the front of the connector. A sealing 111 is mounted on the connector, bearing on the front surface 108. Behind the extending flange, the connector is provided with outwardly protruding catches. A first protruding catch 109 is provided on the second side 101 and a second protruding catch 110 is provided on the fourth side 103.

The catches are angled outwards from the extending flange 107. The first protruding catch 109 is provided with a first bearing surface 114 directed to the rear of the connector and the second protruding catch 110 is provided with a second bearing surface 115 directed to the rear of the connector. The bearing surfaces are perpendicular to a longitudinal axis of the connector. The bearing surfaces allows the openings in the safety sleeve to lock to the protruding catches.

FIG. 4 shows an example of the second connector 3. In the shown example, a C14 inlet connector is used as an example of a second connector, but other types would also be possible to use. The connector 3 is provided with an extending wall 200 that extends outwards from the connector. Conventional inlets are normally not provided with an extending wall. In this case, the wall will hold the protruding caches. At the same time, the inner depth of the connector is reduced, which may save some space in the appliance. The wall has a front surface 203. On the wall, a first protruding catch 201 and a second protruding catch 202 are provided. The wall is provided with a first side 204, a second side 205, a third side 206 and a fourth side 207. The connector is rectangular, with the first and the third sides being the long sides and the second and fourth sides being the short sides. The edges between the third side and the second side respectively the fourth side are chamfered. The connector is provided with a first connection pin 209, a second connection pin 210 and a third connection pin 211 for the electrical connection. The connector is provided with mounting holes 208 that are used to mount the connector to a housing or the like. The connector is preferably closed such that a waterproof connector is obtained. At the rear of the connector, rear connection terminals 212 are provided. These may either be adapted for flat cable shoes or may be soldering pins for soldering to a PCB.

The first protruding catch 201 is provided on the first side 204 and a second protruding catch 202 is provided on the third side 206. The catches are angled outwards from the front surface 203. The first protruding catch 201 is provided with a first bearing surface 213 facing rearwards and the second protruding catch 202 is provided with a second bearing surface 214 facing rearwards. The bearing surfaces are flat and allows the openings in the safety sleeve to lock to the protruding catches.

FIG. 5 shows an example of the safety sleeve 4. The safety sleeve 4 is provided with a first side 300, a second side 301, a third side 302 and a fourth side 303. The safety sleeve is rectangular and is adapted to the shape of the connectors, with the first and the third sides being the long sides and the second and fourth sides being the short sides. The edges between the second side and the third side respectively the fourth side are chamfered, and all edges are provided with a radius. The safety sleeve is provided with a first rim 304 arranged in a first plane and a second rim 305 arranged in a second plane. The rims are substantially flat with no part of the safety sleeve sticking out from any of the rims. The first rim is adapted to be directed towards the second connector and the second rim is adapted to be directed towards the first connector. The outer shape of the safety sleeve is somewhat angled, with the outer circumference of the first rim 304 being slightly larger than the outer circumference of the second rim 305.

The safety sleeve is provided with openings adapted to cooperate with the protruding catches of the first connector and the second connector. The first side 300 is provided with a first opening 306 having a first locking surface 315 arranged close to the first rim. The opening is arranged in a first resilient tab 307. The first resilient tab takes up most of the first side and is fixed at the second rim. The resilient tab can thus flex somewhat at the first rim, such that it can enter a protruding catch of the second connector. The first resilient tab is positioned between the first rim and the second rim of the safety sleeve.

The third side 302 is provided with a third opening 310 having a third locking surface 317 arranged close to the first rim. The opening is arranged in a third resilient tab 311. The third resilient tab takes up most of the third side and is fixed at the second rim. The resilient tab can thus flex somewhat at the first rim, such that it can enter a protruding catch of the second connector. The third resilient tab is positioned between the first rim and the second rim of the safety sleeve.

The first resilient tab and the third resilient tab are identical and will lock the safety sleeve to the second connector. When the safety sleeve is attached to the second connector, the first rim 304 will be positioned close to the body of the second connector. The resilient tabs will in the shown example lock the safety sleeve to the second connector in a more or less permanent manner, since there is no possibility to reach under the resilient tabs in order to unlock them from the second connector. This will prohibit that the safety sleeve is removed by mistake. If the safety sleeve is damaged, it is easy to break it and to replace it with a new safety sleeve. It would be possible to provide the resilient tabs with an extending member that would allow a resilient tab to be disconnected from the second connector.

The second side 301 of the safety sleeve is provided with a second opening 308 having a second locking surface 316 arranged close to the second rim. The opening is arranged in a second resilient tab 309. The second resilient tab is fixed at the first rim 304. The resilient tab can thus flex somewhat at the second rim, such that it can enter a protruding catch of the first connector. The third resilient tab is positioned between the first rim and the second rim of the safety sleeve.

The fourth side 303 is provided with a fourth opening 312 having a fourth locking surface 318 arranged close to the second rim. The opening is arranged in a fourth resilient tab 313. The fourth resilient tab is fixed at the first rim. The resilient tab can thus flex somewhat at the second rim, such that it can enter a protruding catch of the first connector. The fourth resilient tab is positioned between the first rim and the second rim of the safety sleeve.

The second resilient tab and the fourth resilient tab are identical and will lock the safety sleeve to the first connector. When the safety sleeve is attached to the first connector, the second rim 305 will extend over the extending flange 107 with the inner sides of the second resilient tab and the fourth resilient tab bearing on the extending flange. This will position the tip of the resilient tabs at a distance from the body of the first connector. This will allow the resilient tabs to be bent outwards by using e.g. a screwdriver, such that the first connector can be disconnected from the safety sleeve and thus from the second connector if required. This may be advantageous if e.g. the cable of the first connector needs replacement, or if the connector at the other end of the cable is damaged or broken. It would be possible to provide the resilient tabs with a shape that prohibits the outward bending of the resilient tabs such that the first connector cannot be disconnected without breaking the safety sleeve.

In the shown example, the first and the third resilient tabs are designed to be less flexible and more rigid than the third and the fourth resilient tabs. This will further help to attach the safety sleeve permanently to the second connector, and to allow the first connector to be disconnected from the safety sleeve.

When the connector system is assembled, the safety sleeve is first mounted to the second connector by positioning the safety sleeve to the second connector. In doing this, the first resilient tab 307 will bear on the first protruding catch 201 and the third resilient tab 311 will bear on the second protruding catch 202. By pressing the safety sleeve towards the second connector, the resilient tabs will flex outwards until the openings of the resilient tabs embrace the protruding catches, and that the first bearing surface 213 bears on the first locking surface 315 and that the second bearing surface 214 bears on the third locking surface 317. The safety sleeve is now secured to the second connector.

With the safety sleeve attached to the second connector, the first connector can be attached to the safety sleeve and to the second connector. This can be done at the same time, or the appliance may be delivered with the safety sleeve attached to the second connector. When the first connector is to be attached to the second connector, it is inserted through the safety sleeve until the second resilient tab 309 bears on the first protruding catch 109 and the fourth resilient tab 313 bears on the second protruding catch 110. By pushing the first connector further, the resilient tabs will flex outwards until the openings of the resilient tabs embrace the protruding catches, and that the first bearing surface 114 bears on the second locking surface 316 and that the second bearing surface 115 bears on the fourth locking surface 318. The first connector is now secured to the safety sleeve, and thus to the second connector. A connection with a first connector securely attached to a second connector and that is protected to at least IP 54 or more preferably IP65 is now obtained.

The invention is not to be regarded as being limited to the embodiments described above, a number of additional variants and modifications being possible within the scope of the subsequent patent claims.

REFERENCE SIGNS

1: Connector system
2: First connector
3: Second connector
4: Safety sleeve
100: First side
101: Second side
102: Third side
103: Fourth side
104: First connection bay
105: Second connection bay
106: Third connection bay
107: Extending flange
108: Front surface
109: First protruding catch
110: Second protruding catch
111: Sealing
112: Cable
113: Stress relief
114: First bearing surface
115: Second bearing surface
200: Extending wall
201: First protruding catch

202: Second protruding catch
203: Front surface
204: First side
205: Second side
206: Third side
207: Fourth side
208: Mounting holes
209: First connection pin
210: Second connection pin
211: Third connection pin
212: Rear connection terminals
213: First bearing surface
214: Second bearing surface
300: First side
301: Second side
302: Third side
303: Fourth side
304: First rim
305: Second rim
306: First opening
307: First resilient tab
308: Second opening
309: Second resilient catch
310: Third opening
311: Third resilient catch
312: Fourth opening
313: Fourth resilient catch
314: Circumferential body
315: First locking surface
316: Second locking surface
317: Third locking surface
318: Fourth locking surface

The invention claimed is:

1. Safety sleeve (4) for a connector system (1) comprising a first connector (2) and a second connector (3), the safety sleeve (4) being adapted to lock the first connector (2) to the second connector (3) and comprising:

- a circumferential body (314) having a first rim (304) arranged in a first plane and a second rim (305) arranged in a second plane,
- a first opening (306) arranged on a first resilient tab (307),
- a second opening (308) arranged on a second resilient tab (309),
- a third opening (310) arranged on a third resilient tab (311), and
- a fourth opening (312) arranged on a fourth resilient tab (313), wherein:
  - the first opening (306) is adapted to cooperate with a first protruding catch (201) of the second connector (3) and the third opening (310) is adapted to cooperate with a second protruding catch (202) of the second connector (3),
  - the second opening (308) is adapted to cooperate with a first protruding catch (109) of the first connector (2) and the fourth opening (312) is adapted to cooperate with a second protruding catch (110) of the first connector (2),
  - the first opening (306) and the third opening (310) are arranged at the first rim (304) and the second opening (308) and the fourth opening (312) are arranged at the second rim (305),
  - the resilient tabs (307, 309, 311, 313) are positioned between the first rim (304) and the second rim (305),
  - the first resilient tab (307) and the third resilient tab (311) extend from the second rim (305), and
  - the second resilient tab (309) and the fourth resilient tab (313) extend from the first rim (304).

2. Safety sleeve according to claim 1, wherein the openings (306, 308, 310, 312) are rectangular.

3. Safety sleeve according to claim 1, wherein the body (314) is inclined from the first rim (304) to the second rim (305), where the outer circumference of the first rim (304) is larger than the outer circumference of the second rim (305).

4. Safety sleeve according to claim 3, wherein the wall thickness of the body (314) at the first rim (304) is thicker than the wall thickness of the body (314) at the second rim (305).

5. Safety sleeve according to claim 1, wherein the resilience of the second resilient tab (309) and the fourth resilient tab (313) is greater than the resilience of the first resilient tab (307) and the third resilient tab (311).

6. Safety sleeve according to claim 1, wherein the safety sleeve (4) is made from a single plastic material.

7. Connector system (1) comprising a first connector (2), a second connector (3) and the safety sleeve (4) according to claim 1, wherein the first connector (2) comprises a first protruding catch (109) and a second protruding catch (110) and that the second connector (3) comprises a first protruding catch (201) and a second protruding catch (202), where the first opening (306) and the third opening (310) of the safety sleeve (4) locks the first protruding catch (201) and the second protruding catch (202) of the second connector (3), and the second opening (308) and the fourth opening (312) of the safety sleeve (4) locks the first protruding catch (109) and the second protruding catch (110) of the first connector (2), such that the first connector (2) and the second connector (3) are securely locked to each other, and that the connector system (1) further comprises a sealing (111) arranged between a front surface (203) of the second connector (3) and a front surface (108) of an extending flange (107) of the first connector (2).

8. Connector system according to claim 7, wherein the second connector (3) comprises an outwardly extending wall (200) on which the first protruding catch (201) and a second protruding catch (202) are arranged.

9. Connector system according to claim 7, wherein the connector system (1) conforms to an Ingress Protection Code according to IEC standard 60529 of at least IP54.

10. Connector system according to claim 7, wherein the connector system (1) conforms to an Ingress Protection Code according to IEC standard 60529 of at least IP65.

11. Connector system according to claim 7, wherein the first connector (2) is a plug and the second connector (3) is an inlet.

12. Connector system according to claim 7, wherein the first connector (2) is a plug and the second connector (3) is a socket.

13. Connector system according to claim 7, wherein the first protruding catch (109) and the second protruding catch (110) of the first connector (2) are arranged at short sides (101, 103) of the first connector (2), and that the first protruding catch (201) and the second protruding catch (202) of the second connector (3) are arranged at long sides (204, 206) of the second connector (3).

14. Safety sleeve (4) for a connector system (1) comprising a first connector (2) and a second connector (3), the safety sleeve (4) being adapted to lock the first connector (2) to the second connector (3) and comprising:

- a circumferential body (314) having a first rim (304) arranged in a first plane and a second rim (305) arranged in a second plane,
- a first opening (306) arranged on a first resilient tab (307), a second opening (308) arranged on a second resilient tab (309), a third opening (310) arranged on a third resilient tab (311), and a fourth opening (312) arranged on a fourth resilient tab (313), wherein:

the first opening (306) is adapted to cooperate with a first protruding catch (201) of the second connector (3) and the third opening (310) is adapted to cooperate with a second protruding catch (202) of the second connector (3), the second opening (308) is adapted to cooperate with a first protruding catch (109) of the first connector (2) and the fourth opening (312) is adapted to cooperate with a second protruding catch (110) of the first connector (2), the first opening (306) and the third opening (310) are arranged at the first rim (304) and the second opening (308) and the fourth opening (312) are arranged at the second rim (305), the resilient tabs (307, 309, 311, 313) are positioned between the first rim (304) and the second rim (305), the body (314) is inclined from the first rim (304) to the second rim (305), and the outer circumference of the first rim (304) is larger than the outer circumference of the second rim (305).

15. Safety sleeve (4) for a connector system (1) comprising a first connector (2) and a second connector (3), the safety sleeve (4) being adapted to lock the first connector (2) to the second connector (3) and comprising:

a circumferential body (314) having a first rim (304) arranged in a first plane and a second rim (305) arranged in a second plane, a first opening (306) arranged on a first resilient tab (307), a second opening (308) arranged on a second resilient tab (309), a third opening (310) arranged on a third resilient tab (311), and a fourth opening (312) arranged on a fourth resilient tab (313), wherein:

the first opening (306) is adapted to cooperate with a first protruding catch (201) of the second connector (3) and the third opening (310) is adapted to cooperate with a second protruding catch (202) of the second connector (3), the second opening (308) is adapted to cooperate with a first protruding catch (109) of the first connector (2) and the fourth opening (312) is adapted to cooperate with a second protruding catch (110) of the first connector (2), the first opening (306) and the third opening (310) are arranged at the first rim (304) and the second opening (308) and the fourth opening (312) are arranged at the second rim (305).

the resilient tabs (307, 309, 311, 313) are positioned between the first rim (304) and the second rim (305), and the resilience of the second resilient tab (309) and the fourth resilient tab (313) is greater than the resilience of the first resilient tab (307) and the third resilient tab (311).

* * * * *